(12) United States Patent
Batton

(10) Patent No.: US 12,295,372 B1
(45) Date of Patent: *May 13, 2025

(54) OIL-BASED INSECT REPELLENT COMPOSITION

(71) Applicant: S. C. JOHNSON & SON, INC., Racine, WI (US)

(72) Inventor: Chyree S. Batton, West Allis, WI (US)

(73) Assignee: S. C. JOHNSON & SON, INC., Racine, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/836,911

(22) Filed: Jun. 9, 2022

(51) Int. Cl.
| A01N 65/22 | (2009.01) |
| A01N 37/02 | (2006.01) |
| A01N 61/02 | (2006.01) |
| A01N 65/28 | (2009.01) |
| A01N 65/44 | (2009.01) |

(52) U.S. Cl.
CPC ............ *A01N 65/22* (2013.01); *A01N 37/02* (2013.01); *A01N 61/02* (2013.01); *A01N 65/28* (2013.01); *A01N 65/44* (2013.01)

(58) Field of Classification Search
None
See application file for complete search history.

(56) References Cited

U.S. PATENT DOCUMENTS

| 7,201,926 B2 | 4/2007 | Fried et al. |
| 7,232,844 B2 | 6/2007 | Hallahan |
| 8,397,427 B2 | 3/2013 | Schneidmiller et al. |
| 9,326,524 B1 | 5/2016 | Jack et al. |
| 9,999,218 B2 | 6/2018 | Manhas et al. |
| 9,999,227 B2 | 6/2018 | Manhas et al. |
| 10,149,481 B2 | 12/2018 | Bissinger et al. |
| 10,785,977 B2 | 9/2020 | Vandock et al. |
| 10,905,114 B2 | 2/2021 | Manhas et al. |
| 11,653,654 B1 * | 5/2023 | Batton ................ A01N 31/02 424/747 |
| 2007/0053947 A1 | 3/2007 | Emerson |
| 2007/0190094 A1 | 8/2007 | Bessette |
| 2007/0224232 A1 | 9/2007 | Sherwood |
| 2008/0187607 A1 | 8/2008 | Bessette |
| 2008/0274072 A1 | 11/2008 | Manolas et al. |
| 2009/0148528 A1 | 6/2009 | Georges |
| 2010/0120724 A1 | 5/2010 | Bessette |
| 2013/0017281 A1 | 1/2013 | Nouvel |
| 2013/0183392 A1 | 7/2013 | Moore et al. |
| 2014/0050809 A1 | 2/2014 | Angone |
| 2014/0335140 A1 | 11/2014 | Hoag et al. |
| 2016/0165899 A1 | 6/2016 | Bissinger et al. |
| 2016/0243038 A1 * | 8/2016 | Shah ................ A61K 31/7034 |
| 2017/0118998 A1 | 5/2017 | Bessette et al. |
| 2017/0208822 A1 | 7/2017 | Murray et al. |
| 2017/0231231 A1 | 8/2017 | Enan |
| 2017/0319465 A1 | 11/2017 | Murray et al. |
| 2018/0014513 A1 | 1/2018 | Mascari et al. |
| 2018/0035674 A1 | 2/2018 | Schmidt et al. |
| 2019/0208778 A1 | 7/2019 | Schmidt et al. |
| 2019/0373898 A1 | 12/2019 | Murray et al. |
| 2019/0380350 A1 | 12/2019 | Murray et al. |
| 2020/0000693 A1 | 1/2020 | Traynor et al. |
| 2020/0222297 A1 | 7/2020 | Park et al. |
| 2020/0390110 A1 | 12/2020 | Lane |
| 2021/0144995 A1 * | 5/2021 | Vidal ................ A01N 37/02 |
| 2021/0145011 A1 | 5/2021 | Li et al. |
| 2022/0079168 A1 * | 3/2022 | Murray ................ A01N 65/20 |

FOREIGN PATENT DOCUMENTS

| EP | 1299500 A2 | 1/2012 | |
| JP | 2016527188 A5 * | 12/2016 | |
| JP | 6948774 B2 * | 10/2021 | |
| WO | WO-02087527 A1 * | 11/2002 | ............ A01N 25/34 |
| WO | 2007014575 A1 | 2/2007 | |
| WO | 2007129818 A1 | 11/2007 | |
| WO | 2020176697 A1 | 9/2020 | |
| WO | 2020180269 A1 | 9/2020 | |
| WO | 2020198853 A1 | 10/2020 | |
| WO | 2020261084 A1 | 12/2020 | |
| WO | 2002087527 A1 | 11/2022 | |

OTHER PUBLICATIONS

Abo-El-Saad et al., Repellent and Fumigant Effects of Essential Oil from Clove Buds Syzygium Aromaticum L. Against Tribolium Castaneum (Herbest) (Coleoptera: Tenebrionidae), Journal of Agricultural Science and Technology A 1, 2011, pp. 613-620.
Atkinson, Herbal Help: [First Edition], Daily Record, Jun. 25, 2003, retrieved from database Proquest: https://www.proquest.com/newspapers/herbal-help/docview/327947315/se-2?accountid=14753, 3 pages.
El-Kholany, Utilization of Essential Oils from Citronella and Geranium as Natural Preservative in Mayonnaise, International Journal of Microbiology and Biotechnology, 2016, 1(1):49-59.

* cited by examiner

*Primary Examiner* — Alton N Pryor
(74) *Attorney, Agent, or Firm* — Quarles & Brady LLP

(57) ABSTRACT

A composition for repelling insects is disclosed. The composition may include an active component made of (i) a combination of clove oil, geranium oil, and peppermint oil, (ii) a fixative, and (iii) a solubilizer. The composition may include (i) from about 2.5 to about 15 wt. % of an active component made only of (a) from about 0.1 to about 5.0 wt. % of clove oil, (b) from about 0.5 to about 15.0 wt. % of geranium oil, and (c) from about 0.1 to about 15.0 wt. % of peppermint oil, (ii) from about 3 to about 15 wt. % of a fixative, and (iii) from about 15 to about 45 wt. % of a solubilizer.

6 Claims, No Drawings

OIL-BASED INSECT REPELLENT COMPOSITION

BACKGROUND

1. Technology Field

The present disclosure relates to the field of insect repellent technology.

2. Description of the Background

A variety of insects such as mosquitoes and house flies bite and otherwise annoy humans. Various means have been developed to inhibit this. One approach is to place a volatile insect repellent chemical directly on human skin. In addition to efficacy, a number of factors influence the use of personal insect repellents including safety (whether actual or perceived) and aesthetics such as skin feel and odor.

There are many commercially available mosquito repellents; for example, DEET has been shown in many studies to exhibit good repellency against numerous mosquito species. DEET has been used for decades with very few reports of toxicity; however, the belief that DEET is a health and environmental hazard still exists for some people.

Consumers are increasingly looking to natural solutions for pest control especially in the personal repellent space. These consumers have a profile that leads them to natural products including: (i) they have a chemophobia of synthetic actives like DEET; (ii) they have a positive perception of essential oils as natural and safe; (iii) they are more forgiving of efficacy if a product is deemed "natural"; and (iv) they want to use products on infants and children. As a result, plant-based essential oil insect repellents have been proposed as an alternative to DEET and other synthetic insect repellents.

Under the Federal Insecticide, Fungicide and Rodenticide Act (FIFRA) section 25(b)(2), the U.S. Environmental Protection Agency (EPA) may exempt from the requirements of FIFRA any pesticide that is "of a character unnecessary to be subject to [FIFRA]." Pursuant to this authority, the EPA provides lists of pesticides that are exempt from FIFRA regulation. A number of plant-based essential oil repellents are available commercially, in many cases due to their rapid registration process under the U.S. EPA's FIFRA section 25(b).

Many of the ingredients on the FIFRA section 25(b) list are highly volatile essential oils, causing them to provide only short-term repellent duration as they evaporate rapidly, and/or absorb into skin. Increasing the concentration of the essential oil active ingredient can lengthen the duration of repellency; however, many essential oils are irritating to the skin above a certain concentration.

A prevailing issue with many essential oil-based formulations is that they do not repel mosquitoes or only repel them for a short time (i.e., 60 minutes or less). Thus, a problem with essential oil-based repellents is that they may not repel mosquitoes effectively, and/or they may have negative sensory attributes (negative skin feel, negative smell profile). As it stands, the majority of section 25(b) formulations on the market fall into three categories: (1) low duration, negative skin feel; (2) long duration, negative skin feel; and (3) low duration, positive skin feel. Applicant is not aware of any commercially available formulas that have positive skin feel and long duration.

Therefore, there is a need for an insect repellent composition including one or more essential oils wherein the insect repellent composition provides a high level of repellency for an extended period of time while simultaneously exhibiting desirable aesthetics, such as pleasant odor and positive skin feel.

SUMMARY

In one embodiment, the disclosure includes a composition for repelling insects, with an active component including at least one of: (a) clove oil, geranium oil, and peppermint oil; or (b) clove oil, thyme oil, and citronella oil. The composition also has a fixative and a solubilizer. Further, the composition may include a film former. The peppermint oil may be the oil of *Mentha arvenis*, the oil of *Mentha piperita*, and any combinations thereof.

In one embodiment, the disclosure includes a composition for repelling insects, with an active component including: a) at least one essential oil selected from the group consisting of clove oil, geraniol, and lemongrass oil, and b) at least two essential oils selected from the group consisting of peppermint oil, geranium oil, thyme oil, citronella oil, and eugenol. The composition also has a fixative and a solubilizer. The peppermint oil may be the oil of *Mentha arvenis*, the oil of *Mentha piperita*, and any combination thereof.

In an embodiment, the disclosure includes an oil-based composition for repelling insects with an active component including at least three essential oils selected from clove oil, peppermint oil, geranium oil, thyme oil, citronella oil, geraniol, lemongrass oil, and eugenol. The composition also has a fixative and a solubilizer. The composition further has an emollient. The peppermint oil may be the oil of *Mentha arvenis*, the oil of *Mentha piperita*, and any combination thereof.

In an embodiment, the disclosure includes a oil-based composition for repelling insects with about 5 wt. % to about 15 wt. % of an active component including (a) from about 0.1 wt. % to about 3.0 wt. % of clove oil; (b) from about 0.5 wt. % to about 10.0 wt. % of geranium oil; and (c) from about 0.1 wt. % to about 10.0 wt. % of peppermint oil. The composition also has from about 3 wt. % to about 15 wt. % of a fixative and from about 5 wt. % to about 15 wt. % of a solubilizer. The composition further has from about 40 wt. % to about 95 wt. % of an emollient. The peppermint oil may be the oil of *Mentha arvenis*, the oil of *Mentha piperita*, and any combination thereof.

In another embodiment, the disclosure includes a water-based composition for repelling insects with an active component consisting essentially of (a) from about 0.1 wt. % to about 3.0 wt. % of clove oil; (b) from about 0.5 wt. % to about 10.0 wt. % of geranium oil; and (c) from about 0.1 wt. % to about 10.0 wt. % of peppermint oil. The composition also has a fixative and a solubilizer. The peppermint oil may be the oil of *Mentha arvenis*, the oil of *Mentha piperita*, and any combination thereof. Additionally, the composition has a duration that is greater than or equal to 2.5 hours.

DETAILED DESCRIPTION

The term "about," as used herein, refers to variation in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about"

and "approximately" refer to a range of values±5% of the numeric value that the term precedes.

In an embodiment composition for repelling insects, the composition includes:
i. an active component comprising:
   a) clove oil, geranium oil, and peppermint oil; or
   b) clove oil, thyme oil, and citronella oil;
ii. a fixative; and
iii. a solubilizer.

In an embodiment composition for repelling insects, the composition includes:
i. an active component comprising:
   a) at least one essential oil selected from the group consisting of clove oil, geraniol, and lemongrass oil; and
   b) at least two essential oils selected from the group consisting of peppermint oil, geranium oil, thyme oil, citronella oil, and eugenol;
ii. a fixative; and
iii. a solubilizer.

In embodiment composition for repelling insects, the composition includes:
i. an active component comprising:
   a) clove oil;
   b) geranium oil; and
   c) peppermint oil;
ii. a fixative;
iii. a solubilizer; and
iv. an emollient.

In a particular embodiment composition for repelling insects, the composition includes:
i. from about 2.5 wt. % to about 15 wt. % of an active component consisting essentially of:
   a) from about 0.1 wt. % to about 5.0 wt. % of clove oil;
   b) from about 0.5 wt. % to about 15.0 wt. % of geranium oil; and
   c) from about 0.1 wt. % to about 15.0 wt. % of peppermint oil;
ii. from about 1 wt. % to about 15 wt. % of a fixative;
iii. from about 3 wt. % to about 20 wt. % of a solubilizer; and
iv. from about 40 wt. % to about 95 70 wt. % of an emollient.
wherein all weight percentages are percent by weight of the total composition.

Active Component

Essential Oils. The oil-based insect repellent formulation includes an active component comprising a combination of essential oils as the insect repelling active ingredient. The combination of essential oils may comprise clove oil, peppermint oil, geranium oil, thyme oil, citronella oil, geraniol, lemongrass oil, eugenol, and any combination thereof. In some embodiments, the combination of essential oils may comprise at least three of: clove oil, peppermint oil, geranium oil, thyme oil, citronella oil, geraniol, lemongrass oil, and eugenol. In some embodiments, the combination of essential oils may comprise at least one of (a) clove oil, geranium oil, and peppermint oil, or at least one of (b) clove oil, thyme oil, and citronella oil.

In some embodiments, the combination of essential oils may comprise a combination of (a) at least one essential oil selected from the group consisting of clove oil, geraniol, and lemongrass oil, and (b) at least two essential oils selected from the group consisting of peppermint oil, geranium oil, thyme oil, citronella oil, and eugenol. In some embodiments the combination of essential oils may comprise a combination of at least one essential oil from Group A (i.e. a "first essential oil") and at least two essential oils from Group B (i.e. "a second essential oil"). As used herein, an essential oil from Group A is an essential oil that is typically used in a repellent at a relatively low concentration (for example, less than about 2 wt %). Some examples of essential oils from Group A include, but are not limited to, clove oil, geraniol, and lemongrass oil. As used herein, an essential oil from Group B is an essential oil that is typically used in a repellent at a relatively higher concentration (for example, greater than about 2 wt %). Some examples of essential oils from Group B include, but are not limited to, peppermint oil, geranium oil, thyme oil, citronella oil, and eugenol.

In some non-limiting examples, the combination of essential oils comprises clove oil, peppermint oil, and geranium oil. One particularly advantageous combination of essential oils consists essentially of clove oil, peppermint oil, and geranium oil. Another advantageous combination of essential oils consists only of clove oil, peppermint oil, and geranium oil.

Particular strains of certain essential oils may be especially well-suited for use in certain oil-based insect repellent formulations. For the purposes of this disclosure, "peppermint oil" is defined to be the oil of *Mentha arvenis*, the oil of *Mentha piperita*, and any combination thereof. For example, in certain formulations, it is particularly advantageous to use the *Arvensis* strain of peppermint oil (i.e. *Mentha arvenis*). The oil of *Mentha arvenis* is sometimes commonly referred to as cornmint oil. Without wishing to be bound by any particular theory, *Mentha arvenis* oil may be particularly advantageous due to the unusually high levels of menthol that it contains. One skilled in the art will appreciate that *Mentha arvenis* oil may be difficult to use in certain liquid formulations, as its menthol levels are so high that when distilled the oil is usually solid. One skilled in the art will also recognize that it may be particularly advantageous to configure any and/or all of the embodiments disclosed herein such that some or all of the peppermint oil in a given embodiment is *Mentha arvenis* oil. Additionally, in certain formulations, it may be particularly advantageous to use the *Piperita* strain of peppermint oil (i.e. *Mentha piperita*). One skilled in the art will appreciate that *Mentha piperita* oil may be difficult to use in certain liquid formulations, for reasons similar to those discussed above with respect to *Mentha arvenis* oil. However, one skilled in the art will also recognize that it may be particularly advantageous to configure any and/or all of the embodiments disclosed herein such that some or all of the peppermint oil in a given embodiment is *Mentha piperita* oil. As another example, in certain formulations, it may be advantageous to use a particular type of clove oil, such as clove bud oil, clove leaf oil, or clove stem oil. Without wishing to be bound by any particular theory, different types of clove oil may commonly contain different concentrations of eugenol, which may affect the repellency/efficacy of the particular type of clove oil. Typically, clove bud oil has 60-90 wt % eugenol, clove leaf oil has 70-82 wt % eugenol, and clove stem oil has 85-92 wt % eugenol. One skilled in the art will also recognize that it may be particularly advantageous to configure any and/or all of the embodiments disclosed herein such that some or all of the clove oil in a given embodiment is any one of clove oil, such as clove bud oil, clove leaf oil, clove stem oil, or a combination thereof. As still another example, in certain formulations, it may advantageous to use a particular strain of geranium oil, such as the Egyptian strain of geranium oil or the Bourbon strain of geranium oil. One skilled in the art will also recognize that it may be particularly advantageous to configure any and/or all of the embodiments disclosed herein such that some or all of the geranium oil in a given embodiment is any one of the Egyptian strains of geranium oil, the Bourbon strain of geranium oil, or a combination thereof.

The total amount active component (i.e. the total amount of essential oils in the composition) may be from about 2.0 wt. %, or from about 2.5 wt. %, or from about 5 wt. %, or from about 6 wt. %, or from about 7 wt. %, or from about 8 wt. %, or from about 9 wt. %, or from about 10 wt. %, and to about 25 wt. %, or to about 22 wt. %, or to about 20 wt. %, or to about 17 wt. %, or to about 15 wt. %, or to about 14 wt. %, or to about 14 wt. %, or to about 13 wt. %, or to about 12 wt. %, or to about 11 wt. %, or to about 10 wt. %. In an embodiment, the total amount active component is present in an amount from about 2.5 wt. % to about 15 wt. %, or from about 5 wt. % to about 15 wt. %, wherein all weight percentages are percent by weight of the total composition. In an embodiment, the total amount active component is present in an amount from about 10 wt. % to about 12 wt. % wherein all weight percentages are percent by weight of the total composition. In an embodiment, the total amount active component is present in an amount of about 10 wt. % based on the total weight of the total composition.

More specifically, in some embodiments the active component may comprise a combination of pre-determined amounts of clove oil, peppermint oil, and geranium oil. For example, the active component may comprise a combination of (i) from about 0.1 wt. % to about 5.0 wt. % of clove oil, (ii) from about 0.5 wt. % to about 15.0 wt. % of geranium oil, and (iii) from about 0.1 wt. % to about 15.0 wt. % of peppermint oil. Some embodiments may comprise from about 0.1 wt. %, or from about 0.2 wt. %, or from about 0.3 wt. %, or from about 0.4 wt. %, or from about 0.5 wt. %, and to about 5.0 wt. % of clove oil, or to about 3.0 wt. % of clove oil, or to about 2.0 wt. % of clove oil, or to about 1.0 wt. % of clove oil, or to about 0.5 wt. % of clove oil. Some embodiments may comprise from about 1 wt. % of geranium oil, or from about 2 wt. %, or from about 3 wt. %, or from about 4 wt. %, or from about 5 wt. % of geranium oil, and to about 15 wt. % of geranium oil, or to about 12 wt. %, or to about 10 wt. %, or to about 8 wt. %, or to about 7 wt. %, or to about 6 wt. %, or to about 5 wt. % of geranium oil. Some embodiments may comprise from about 1 wt. % of peppermint oil, or from about 2 wt. %, or from about 3 wt. %, or from about 4 wt. %, or from about 4.5 wt. % of peppermint oil, and to about 15 wt. % of peppermint oil, or to about 12 wt. %, or to about 10 wt. %, or to about 8 wt. %, or to about 7 wt. %, or to about 6 wt. %, or to about 4.5 wt. % of peppermint oil based on the weight of the total composition.

The active component is combined with a fixative. In some embodiments, the fixative may be selected from the group consisting essentially of, or consisting of vanillin, esters of organic acids, fumed silica, alkoxylated alcohols, glycol ethers, glycerin aliphatic acid esters, polyethylene glycol, and any combination thereof. More specifically, the fixative may be vanillin. Alternatively, the fixative may be a combination of vanillin and triethyl citrate. Still further, the fixative may be a combination of vanillin and fumed silica. The fixative may be present in any suitable amount. For example, the fixative may be present in an amount from about 1 wt. % to about 15 wt. %, or from about 3 wt. % to about 15 wt. %, or from about 5 wt. % to about 10 wt. %, based on the weight of the total composition. Further, the fixative may be present in an amount from about 1 wt. %, or from about 2 wt. %, or from about 3 wt. %, or from about 4 wt. %, or from about 5 wt. %, or from about 6 wt. %, or from about 7 wt. %, and to about 15 wt. %, or to about 13 wt. %, or to about 12 wt. %, or to about 10 wt. %, or to about 8 wt. %, or to about 7 wt. % based on the weight of the total composition.

The active component is combined with a solubilizer. In some embodiments, the solubilizer may be selected from the group consisting of isopropyl alcohol, ethanol, PEG-40 hydrogenated castor oil, ethoxylated $C_8$-$C_{16}$ alcohol, propylene glycol, ethylene glycol n-hexyl ether, and any combination thereof. More specifically, the solubilizer may be isopropyl alcohol. The solubilizer may be present in any suitable amount. For example, the solubilizer may be present in an amount from about 3 wt. % to about 45 wt. %, or from about 5 wt. % to about 45 wt. %, or from about 3 wt. % to about 20 wt. %, or from about 10 wt. % to about 30 wt. %, based on the weight of the total composition. Further, the solubilizer may be present in an amount from about 1 wt. %, or from about 3 wt. %, or from about 5 wt. %, or from about 7 wt. %, or from about 10 wt. %, or from about 20 wt. %, or from about 25 wt. %, or from about 30 wt. %, and to about 50 wt. %, or to about 40 wt. %, or to about 30 wt. %, or to about 20 wt. %, or to about 15 wt. %, or to about 10 wt. % based on the weight of the total composition.

Oil-Based Formulation

An oil-based formulation comprises an active component (as described above), a fixative, a co-fixative, a solubilizer, and an emollient. Beneficially, combining the active component with an appropriate oil-based formulation may significantly further increase the duration during which the active component remains on the skin of a person (subject) in an amount sufficient to effectively repel insects, as compared to a simple solution primarily contains only the active component and necessary solvent.

Fixative. The oil-based insect repellent formulation may comprise a fixative for amplifying the intensity and lasting qualities of the essential oil active ingredients of the formulation. Non-limiting example fixatives include vanillin, esters of organic acids (e.g., triethyl citrate), silica, alkoxylated alcohols, glycol ethers, glycerin aliphatic acid esters, polyethylene glycol, and any combination thereof. One particularly advantageous fixative is vanillin. Another particularly advantageous fixative is a combination of vanillin and triethyl citrate. Another particularly advantageous fixative is a combination of vanillin and silica. The fixative may be present in any suitable amount. For example, the fixative may be present in an amount from about 3 wt. % to about 15 wt. %, or from about 5 wt. % to about 10 wt. %, or from about 6 wt. % to about 8 wt. %, based on the weight of the total composition. Further, the fixative may be present in an amount from about 2 wt. %, or from about 3 wt. %, or from about 4 wt. %, or from about 5 wt. %, or from about 6 wt. %, or from about 7 wt. %, and to about 15 wt. %, or to about 12 wt. %, or to about 10 wt. %, or to about 7 wt. %, or to about 5 wt. %.

Co-Fixative. In some embodiments, the oil-based insect repellent formulation may also comprise a co-fixative. As used herein, a co-fixative may be an additional second fixative component, in addition to an initial fixative as described above. A co-fixative may be used for the same or similar purpose as an initial fixative, for example the co-fixative may also be used to amplify the intensity and lasting qualities of the essential oil active ingredients of the formulation. For example, a fixative component may comprise a fixative that is vanillin and a co-fixative that is triethyl citrate. Another particularly advantageous a fixative component may comprise a fixative that is vanillin and a co-fixative that is a silica, such as fumed silica. A co-fixative may be present in the same amount or in a different amount than the initial fixative. For example, the co-fixative may be present in an amount from about 1 wt. % to about 15 wt. %, or from about 1 wt. % to about 5 wt. %, based on the weight of the total composition. Further, the co-fixative may be present in an amount from about 0.5 wt. %, or from about 1 wt. %, or from about 1.5 wt. %, or from about 2 wt. %, and to about 5 wt. %, or to about 4 wt. %, or to about 3 wt. %, or to about 2.5 wt. %, or to about 2 wt. %. In a particular embodiment, the initial fixative may be present in an amount of about wt. % and the co-fixative may also be present in an amount of about 2 wt. %.

Solubilizer. The oil-based insect repellent formulation may comprise a solubilizer for dissolving or dispersing the combination of essential oils of the formulation. Non-limiting example solubilizers include $C_1$-$C_8$ alcohols (e.g., isopropyl alcohol), hydrogenated and polyethoxylated oils (e.g., PEG-40 hydrogenated castor oil), alkoxylated alcohols (e.g., ethoxylated $C_8$-$C_{16}$ alcohol), alkylene glycols (e.g., propylene glycol), glycol ethers (e.g., ethylene glycol n-hexyl ether), and fatty acids (especially short chain fatty acids) such as $C_1$-$C_{18}$ short chain fatty acids including lauric acid and oleic acid and any combination thereof. One particularly advantageous solubilizer is isopropyl alcohol. The solubilizer may be present in any suitable amount. For example, the solubilizer may be present in an amount from about 5 wt. % to about 45 wt. %, or from about 20 wt. % to about 40 wt. %, or from about 25 wt. % to about 35 wt. %, based on the weight of the total composition. Further, the solubilizer may be present in an amount from about 20 wt. %, or from about 25 wt. %, or from about 27 wt. %, or from about 28 wt. %, or from about 29 wt. %, or from about 30 wt. %, and to about 45 wt. %, or to about 40 wt. %, or to about 35 wt. %, or to about 32 wt. %, or to about 31 wt. %, or to about 30 wt. %.

Emollient. The oil-based insect repellent formulation may comprise an emollient for keeping essential oils on the skin longer. Choosing emollients that have low dermal penetration can help keep essential oils on the skin longer. An emollient may maintain the integrity of the hydrolipids of the skin. Non-limiting example emollients include alkanes and mixtures thereof (e.g., mineral oil, paraffin oil), fatty acids (e.g., lauric acid, oleic acid, and stearic acid), fatty alcohols (e.g., cetyl alcohol), esters (e.g., isopropyl myristate and benzoic acid esters of $C_9$-$C_{15}$ alcohols), silicones (e.g., dimethyl polysiloxane), ethers (e.g., polyoxypropylene butyl ethers and polyoxypropylene cetyl ethers), and any combination thereof. In some non-limiting examples, the emollient is mineral oil. One particularly advantageous emollient is a combination of mineral oil and lauric acid. Another advantageous emollient is isopropyl myristate. The emollient may be present in any suitable amount. For example, the emollient may be present in an amount from about 40 wt. % to about 70 wt. %, or from about 50 wt. % to about 60 wt. %, based on the weight of the total composition. Further, the emollient may be present in an amount from about 40 wt. %, or from about 45 wt. %, or from about 46 wt. %, or from about 46.5 wt. %, or from about 47 wt. %, or from about 50 wt. %, or from about 51 wt. %, or from about 52 wt. %, or from about 53 wt. %, and to about 70 wt. %, or to about 65 wt. %, or to about 60 wt. %, or to about 55 wt. %, or to about 53 wt. %, or to about 51 wt. %., or to about 50 wt. %, or to about 49 wt. %, or to about 47 wt. %, or to about 46.5 wt. %, based on the weight of the total composition.

Co-Emollient. In some embodiments, the oil-based insect repellent formulation may also comprise a co-emollient. As used herein, a co-emollient may be an additional second fixative component, in addition to an initial emollient as described above. A co-emollient may be used for the same or similar purpose as an initial emollient, for example the co-emollient may also be used to keep essential oils on the skin longer. Further, a co-emollient may be used to enhance the activity and/or improve the performance of an initial emollient, as described above. For example, choosing co-emollients that themselves have low dermal penetration can help keep essential oils on the skin longer. Moreover, choosing co-emollients that improve a similar function by an initial emollient may also help further keep essential oils on the skin longer. A co-emollient may maintain the integrity of the hydrolipids of the skin. Non-limiting example emollients include alkanes and mixtures thereof (e.g., mineral oil, paraffin oil), fatty acids (e.g., lauric acid, oleic acid, and stearic acid), fatty alcohols (e.g., cetyl alcohol), esters (e.g., isopropyl myristate and benzoic acid esters of $C_9$-$C_{15}$ alcohols), silicones (e.g., dimethyl polysiloxane), ethers (e.g., polyoxypropylene butyl ethers and polyoxypropylene cetyl ethers), and any combination thereof. In one particularly advantageous example, the emollient is mineral oil the co-emollient is lauric acid. A co-emollient may be present in the same amount or in a different amount than the initial emollient. For example, the co-emollient may be present in an amount from about 1 wt. % to about 10 wt. %, or from about 3 wt. % to about 8 wt. %, or from about 5 wt. % to about 7 wt. %, based on the weight of the total composition. Further, the co-emollient may be present in an amount from about 1 wt. %, or from about 2 wt. %, or from about 3 wt. %, or from about 4 wt. %, or from about 5 wt. %, or from about 6 wt. %, or from about 6.5 wt. %, and to about 15 wt. %, or to about 10 wt. %, or to about 9 wt. %, or to about 8 wt. %, or to about 7 wt. %, or to about 6.5 wt. %. In one advantageous embodiment, the initial emollient may be present in an amount of about 46.5 wt. % and the co-emollient may also be present in an amount of about 6.5 wt. %. In one particularly advantageous example, the emollient is mineral oil and is present in an amount of about 46.5 wt. % and the co-emollient is lauric acid and is present in an amount of about 6.5 wt. %, based on the weight of the total composition.

Encapsulant. Encapsulation of synthetic and natural actives have been shown to reduce evaporation, reduce dermal absorption, enhance skin feel, and extend duration. The oil-based insect repellent formulation may comprise an encapsulation material for reducing evaporation, and/or reducing dermal absorption, and/or enhancing skin feel, and/or extending duration of the essential oils in the formulation. Specifically, encapsulation materials can extend the duration of the certain active ingredients (i.e. certain essential oils) by controlling/slowing the release of the essential oil from within the encapsulant, limiting the amount of the essential oil that is available for activity and/or evaporation at any one time. Suitable encapsulation materials for use in the formulation are selected from polymers; capsules, microcapsules and nanocapsules; synthetic polymers and biomaterials including proteins, gums, and carbohydrates; liposomes, absorbents; cyclic oligosaccharides, and any combination thereof. Example advantageous encapsulation materials are cyclic oligosaccharides having a cyclic structure comprising six or more saccharide units. It is common in the art to abbreviate six, seven and eight membered cyclic oligosaccharides to α, β and γ respectively. Particularly advantageous encapsulation materials are α-cyclodextrins or β-cyclodextrins, preferably β-cyclodextrins. The levels of cyclic oligosaccharides used in the formulation will be dependent on the components of the formulation and their levels, for example the combination of essential oils, present in the formulation. The encapsulation material may be present in any suitable amount. In some embodiments, the water-based composition may not comprise any encapsulation material.

Oil-based Insect Repellent Formulations. Some oil-based insect repellent formulations of the present disclosure may comprise:
  i. an active component;
  ii. a fixative;
  iii. a solubilizer; and
  iv. an emollient.

In a particular version of the above advantageous embodiment, the active component may consist essentially of:
  a) from about 0.1 wt. % to about 5.0 wt. % of clove oil;
  b) from about 0.5 wt. % to about 15.0 wt. % of geranium oil; and
  c) from about 0.1 wt. % to about 15.0 wt. % of peppermint oil.

In another version of the above advantageous embodiment, the active component may consist essentially of:
  a) at least one essential oil selected from the group consisting of clove oil, geraniol, and lemongrass oil; and
  b) at least two essential oils selected from the group consisting of peppermint oil, geranium oil, thyme oil, citronella oil, and eugenol.

In still another version of the above advantageous embodiment, the active component may consist essentially of:
  a) clove oil, geranium oil, and peppermint oil; or
  b) clove oil, thyme oil, and citronella oil.

In yet another version of the above advantageous embodiment, the active component may consist essentially of clove oil, geranium oil, and peppermint oil.

Each of the (i) active component, (ii) fixative, (iii) solubilizer, and (iv) emollient may be present in any amount suitable, and more specifically may be present in any of the amounts discussed for each component above.

In one embodiment, an oil-based insect repellent formulation may comprise:
  i. from about 5 wt. % to about 15 wt. % of an active component consisting of:
    a) from about 0.1 wt. % to about 3.0 wt. % of clove bud oil;
    b) from about 0.5 wt. % to about 10.0 wt. % of geranium oil; and
    c) from about 0.1 wt. % to about 10.0 wt. % of peppermint oil;
  ii. from about 3 wt. % to about 15 wt. % of a fixative;
  iii. from about 15 wt. % to about 45 wt. % of a solubilizer; and
  iv. from about 40 wt. % to about 70 wt. % of an emollient.

In a particular version of the above advantageous embodiment, the active component may consist essentially of:
  a) from about 0.1 wt. % to about 5.0 wt. % of clove oil;
  b) from about 0.5 wt. % to about 15.0 wt. % of geranium oil; and
  c) from about 0.1 wt. % to about 15.0 wt. % of peppermint oil.

In another version of the above advantageous embodiment, the active component may consist essentially of:
  a) at least one essential oil selected from the group consisting of clove oil, geraniol, and lemongrass oil; and
  b) at least two essential oils selected from the group consisting of peppermint oil, geranium oil, thyme oil, citronella oil, and eugenol.

In still another version of the above advantageous embodiment, the active component may consist essentially of:
  a) clove oil, geranium oil, and peppermint oil; or
  b) clove oil, thyme oil, and citronella oil.

In yet another version of the above advantageous embodiment, the active component may consist essentially of clove oil, geranium oil, and peppermint oil.

In one embodiment, an oil-based insect repellent formulation may comprise:
  i. from about 8 wt. % to about 12 wt. % of an active component consisting of:
    a) from about 0.1 wt. % to about 3.0 wt. % of clove bud oil;
    b) from about 0.5 wt. % to about 10.0 wt. % of geranium oil; and
    c) from about 0.1 wt. % to about 10.0 wt. % of peppermint oil;
  ii. from about 5 wt. % to about 10 wt. % of a fixative that includes vanillin and fumed silica;
  iii. from about 25 wt. % to about 35 wt. % of a solubilizer that includes isopropyl alcohol; and
  iv. from about 50 wt. % to about 60 wt. % of an emollient, that includes mineral oil and lauric acid. In a particular version of the above advantageous embodiment, the active component may consist essentially of:
    a) from about 0.1 wt. % to about 5.0 wt. % of clove oil;
    b) from about 0.5 wt. % to about 15.0 wt. % of geranium oil; and
    c) from about 0.1 wt. % to about 15.0 wt. % of peppermint oil.

In another version of the above advantageous embodiment, the active component may consist essentially of:
  a) at least one essential oil selected from the group consisting of clove oil, geraniol, and lemongrass oil; and
  b) at least two essential oils selected from the group consisting of peppermint oil, geranium oil, thyme oil, citronella oil, and eugenol.

In still another version of the above advantageous embodiment, the active component may consist essentially of:
  a) clove oil, geranium oil, and peppermint oil; or
  b) clove oil, thyme oil, and citronella oil.

In yet another version of the above advantageous embodiment, the active component may consist essentially of clove oil, geranium oil, and peppermint oil.

Process for Forming Oil-Based Insect Repellent Formulation

A method for producing an oil-based insect repellent formulation according to an embodiment of the present disclosure includes combining an active component comprising essential oils with an emollient and stirring the mixture until it is homogenous, combining a fixative and a solubilizer, stirring and heating the mixture to a temperature from 20° C. to 60° C. while still stirring and dissolving the fixative, and combining both mixtures and stirring until homogenous.

A particularly advantageous method for producing an oil-based insect repellent formulation according to an embodiment of the present disclosure includes combining an actives package comprising three essential oils with a mineral oil and stirring the mixture until it is homogenous, combining a fixative (in particular vanillin) and a solubilizer (in particular isopropyl alcohol), stirring and heating the mixture to about 40° C. while still stirring, until the fixative is completely dissolved, and combining both mixtures and stirring until homogenous.

In certain embodiments, the active component used in a process to form an oil-based insect repellent formulation may comprise at least three of the following essential oils: clove oil, peppermint oil, geranium oil, thyme oil, citronella oil, geraniol, lemongrass oil, and eugenol. In particular embodiments, the active component may consist essentially of clove bud oil, geranium oil, and peppermint oil.

In certain embodiments, the emollient used in a process to form an oil-based insect repellent formulation may be selected from the group consisting of alkanes and mixtures thereof (e.g., mineral oil, paraffin oil), fatty acids (e.g., lauric acid, oleic acid, and stearic acid), fatty alcohols (e.g., cetyl alcohol), esters (e.g., isopropyl myristate and benzoic acid esters of $C_9$-$C_{15}$ alcohols), silicones (e.g., dimethyl polysiloxane), ethers (e.g., polyoxypropylene butyl ethers and polyoxypropylene cetyl ethers), and any combination thereof.

The solubilizer used in a process to form oil-based insect repellent formulations may be selected from the group consisting of $C_1$-$C_8$ alcohols, hydrogenated oils, polyethoxylated oils, alkoxylated alcohols, alkylene glycols, glycol ethers, and any combination thereof. In particular embodiments, the solubilizer may be isopropyl alcohol.

The thickener used in a process to form oil-based insect repellent formulations may be selected from the group consisting of hydrogenated oils, silica and silica derivatives, waxes, clays (e.g. bentonite and kaolin), polyurea, polymerics, cellulose derivatives, starch, and combinations thereof. The thickener may be present in an amount from about 0.1 wt. % to about 5.0 wt. % or from about 0.1 wt. % to about 1.0 wt. %, wherein all weight percentages are percent by weight of the total composition. In particular embodiments, the thickener may be vanillin.

EXAMPLES

The following Examples are provided to demonstrate and further illustrate certain embodiments and aspects of the present disclosure and are not to be construed as limiting the scope of the disclosure.
Test Methods
1. The Insect Repellency Test Efficacy, Duration, and Percent Repellency: The primary method used to assess the efficacy and duration of an insect repellent is the "Arm-in-Cage Test". The term "duration" as used herein refers to the time between (1) the application of the insect repellent composition and (2) when the subject first drops below the applicable minimum percent repellency threshold. For all of the testing methodologies used herein, the minimum threshold value for "percent repellency" at which the measurement for duration is cutoff is at least (≥) 90% repellency. For some testing methodologies used herein (such as the "Arm-in-Cage Test"), the minimum threshold value for "percent repellency" was 90% repellency. For other testing methodologies used herein (such as the "K & D Module Repellency Test"), the minimum threshold value for percent repellency was 100% repellency. When a duration is measured using a minimum threshold of 100% repellency, the duration may also be referred to as "Complete Protection Time" (CPT).

The percent repellency value of a given repellent composition is calculated at each exposure period. The "duration" was calculated using the Kaplan-Meier survival analysis for the last time (in hours) that the test subject's treated arms gave at least the minimum threshold value for "percent repellency" (for example, at least (≥) 90% repellency). At each exposure period, the percent repellency for a test subject's treated arm was calculated using the control count from the test subject's untreated arm. The following formula was used to calculate the percent repellency for each exposure period during the test:

$U_X$=Landing count from a 1 minute exposure of the test subject's untreated arm to the test system at time X
$T_X$=Landing count from a 1 minute exposure of the test subject's treated arm to the test system at time X $(1-(T_X/U_X))*100$=Percent repellency at time $X$ Arm-and-Cage Test Preparation of Test System: For the Arm-in-Cage Test used herein, mosquitoes initially reared in an insectary were moved via rearing cage into the laboratory. Approximately 100 female mosquitoes were removed from rearing cages and placed in test cage using the Posey and Schreck method (Ref. Posey and Schreck-Mosquito News 1981-see Appendix) with the following exceptions:

The airflow apparatus was 54.5 cm long×42.0 cm high× 40.5 cm wide.

There was not a door at the front of the airflow apparatus, instead the bottom was open, and the airflow apparatus could be placed over the rearing cage. Both were placed on the top of a counter.

The Plexiglas cylinder (trap) was 31 cm long and 10 cm wide diameter.

The mesh screen in the cylinder trap was Dacron marquisette mesh not aluminum screening.

There was no Plexiglas cradle. The cylinder trap was held in place.

The fan attached to the back of the airflow apparatus is a Comair Rotron fan-Model #PT283. It was powered by a Powerstat Variable Autotransformer-Type #3PN116C. The Powerstat controlled the air flow rate and is set at 50.

Two cages of the of test system were set up for the test day. The test subjects were split into two groups and each group was assigned to one of the test cages. More than one test cage of the test system was used to reduce exhausting the mosquitoes by exposing them to too many test subjects. Test cages were placed in the test laboratory.

Preparation and Treatment of Test Subjects: The exposed skin of each test subject was cleaned as follows: Test subjects (a.) washed their forearms with non-scented soap and water; (b.) rinsed their arms with water; (c.) dried their arms with a paper towel; (d.) wiped their forearms with 70% ethanol solution or Isopropyl Alcohol; and (e.) air dried their forearms. After cleaning, a treatment area was defined on each test subject's treatment arm by wrapping the wrist and elbow with a layer of athletic tape. Medical tape was placed over the athletic tape to prevent mosquitoes from biting through the athletic tape. Next, for each arm, the surface area (sq. cm) of test subject's arm, from wrist to elbow, was calculated as follows: (1.) The circumference of the arm (in cm) was measured at the wrist, at just below the elbow, and two equally spaced points in between. The total of these circumference measurements was divided by 4 to determine (C); (2.) Length (cm) of arm from wrist to elbow (D) was measured; and (3.) The result of C was multiplied by the result of D. The amount of repellent needed for each sample was determined as follows; (a.) Application rate of 2 grams per 600 cm² (3.34 mg/cm²) of test substance was used for testing. (b.) To use the 2 gram per 600 cm² application rate, the surface area (cm²) of the arm was divided by 600 (cm²), and then multiplied by 2 to calculate the application amount in grams. (c.) The resulting quantity was applied to the test subject's taped treatment arm. The sample was then placed on a tared balance. The targeted calculated amount (by weight) of repellent was removed from the sample container with a pipette. The actual amount applied and the target amount were recorded. Two gloved fingers were used to further spread the repellent evenly over the forearm. After treatment, the test subjects were instructed to avoid abrasion or contamination of the treated areas, or exertion causing unnecessary perspiration or body temperature change.

Laboratory Procedure: Directly before arm exposure, the test subjects put on gloves so that the cuff slightly overlap. The test subject exposed their untreated arm to insects by inserting the arm into the cage through the sleeve until the sleeve bunched around the elbow and slightly overlapped the treated area of the forearm at the elbow. Each test subject exposed their untreated arm to the test system for 1 minute. The test subjects were allowed to shake their arm to remove the test system to avoid any biting. The same insect was counted more than once if it was shaken off and then re-landed. The test subject then exposed their treated arm to the test system for 1 minute and the number of insect lands was counted. Repellency relative to the control was calculated at each time point. The first exposure began 30 minutes post treatment. The second exposure began 60 minutes post treatment. After the second exposure, exposures were repeated every 60 minutes until the test was terminated. The test was terminated when repellency fell below 90% compared to the test subjects untreated arm.

K & D Module Repellency Test

Another method that may be used to assess the insect repellent efficacy of an insect repellent composition is the "K & D Module Repellency Test." The insect repellent efficacy is measured using a minimum repellency threshold of 100% repellency, which may also be referred to as the Complete Protection Time (CPT) of an insect repellent composition, which is the time period between the application of the insect repellent composition and the first insect landing. The "K & D Module Repellency Test" uses a six cell K & D Module as shown in FIG. 14.1, and described in Jerome A. Klun and Matt Kramer, "Klun & Debboun Modules: Uses and Data Analysis", *Insect Repellents Handbook*, Second Edition, edited by Mustapha Debboun et al., CRC Press, 2014, pages 267-281, which is incorporated herein by reference as if set forth in its entirety.

In the K & D Module Repellency Test the test volunteer used a marker and a template, representing the base and the 3 cm.×4 cm. openings of the K & D module, to mark skin areas of his/her arm which were then treated with different insect repellent compositions at a skin dose of 0.0017 grams/cm² against the insect (in this case, *Culex quinquefasciatus*). The rectangular marks on the volunteer's arm represented where the six cells of the K & D module were positioned on the volunteer's arm. Each cell of the K & D module was filled with ten mated female mosquitoes (*Culex quinquefasciatus*), and the floor slide was removed from each cell to expose all mosquitoes to all skin treatments. The time between removing the floor slide of each cell and the first mosquito from the cell landing is recorded as the CPT.

Results

The formulation development process began with an initial list of approximately 170 different essential oils each potentially possessing some form of insect behavior-modifying activity. This initial list of approximately 170 essential oils was then down-selected to 16 essential oils based upon mode of action and other factors.

Bioefficacy testing was conducted on the 16 oils (neat, or in spray/lotion forms) using a method to simulate a skin substrate for testing of insect repellents, as described in U.S. Patent Application Publication No. 2018/0014513, which is incorporated in its entirety herein by reference.

Based on the results of the bioefficacy testing, eight oils were identified for further exploration and development based upon their repellent efficacy and/or duration, with a target repellency duration of at least 2.5 hours. The eight essential oils identified included Thyme Oil, Citronella Oil, Clove Oil, Geraniol, Eugenol, Peppermint Oil, Lemongrass Oil, and Geranium Oil.

A cursory toxicology analysis was performed on each of these eight essential oils to quantify essential oil concentration maximums for screening purposes. In brief, a quantitative risk assessment, following standards set both internally and by the U.S. EPA Standard Operating Procedures for Residential Pesticide Exposure Assessment, was conducted to determine the maximum inclusion level (%) that may potentiate sensitization from these essential oils. The assessment was based on both public and internal data relating to the oils, the commonly found constituents of the oils, and the overlap of constituents between essential oil active ingredients. Of note, this assessment was predicated on the available analytical data for commonly used varieties of these essential oils. Given the inherent variability within the composition of essential oils, the assessment herein is subject to change dependent on validated composition of each oil. Critically, this analysis informed maximum inclusion levels of essential oil content for the insect repellent formulation. These ranges are non-obvious because the ranges cannot be determined by standard methods, such as randomly choosing and testing a variable number, combination, and concentration of oils, involving arbitrary selection and testing of various formulations, due to prohibitions of performing such tests, especially on human and animal subjects.

Following the identification of maximum inclusion levels for potential essential oil concentrations by toxicology analysis, it was necessary to establish the baseline repellency (i.e., the insect repellency duration, as described above) of the essential oil packages absent additional functional components. These "essential oil only" packages are also referred to as "active packages." Numerous different combinations of essential oils, as well as combinations of different essential oil concentrations, that were evaluated as active packages using the "K & D Module Repellency Test" are shown in Table 1 and Table 2 below.

TABLE 1

|  | Geraniol | Eugenol | Peppermint | Geranium | Citronella | Thyme | Lemongrass | Clovebud |
|---|---|---|---|---|---|---|---|---|
| Geraniol | o | | | | | | | |
| Eugenol | x | o | | | | | | |
| Peppermint | x | x | o | | | | w | Thyme or Geranium |
| Geranium | x | x | x | o | | | | |
| Citronella | x | x | x | x | o | | w | Thyme or Geranium |

TABLE 1-continued

|  | Geraniol | Eugenol | Peppermint | Geranium | Citronella | Thyme | Lemongrass | Clovebud |  |
|---|---|---|---|---|---|---|---|---|---|
| Thyme | x | x | x | x | x | o |  |  |  |
| Lemongrass | x | x | x | x | x | x | o | w | Thyme or Geranium |
| Clovebud | x | x | x | x | x | x | x | o |  |

*"o" = Single oil
*"x" = Two Oil Combination
*"w" = Three Oil Combination

TABLE 2

| Sample No. | Active Package Identifier | Sample (in water/isopropanol) | Avg Duration (Min) | Avg Duration (Hours) | Duration (Min) (Time of confirmation land) ||||
|---|---|---|---|---|---|---|---|---|
|  |  |  |  |  | Subject 1 | Subject 2 | Subject 3 | Subject 4 |
| IE1 | AP1 | 0.5% clove oil<br>3.5% thyme oil<br>15% citronella | 180 | 3.0 | 180 | 180 | 180 | 180 |
| IE2 | AP2 | 0.5% clove oil<br>6.5% geranium oil<br>4.5% peppermint oil | 160 | 2.7 | 180 | 150 | 150 | N/A |
| CE1 | AP3 | 5% citronella oil<br>0.7% lemongrass oil | 150 | 2.5 | 150 | 120 | 180 | N/A |
| CE2 | AP4 | 5% peppermint oil<br>5% geranium oil | 140 | 2.3 | 150 | 180 | 90 | N/A |
| CE3 | AP5 | 0.7% lemongrass oil<br>6.5% geranium oil | 140 | 2.3 | 180 | 150 | 90 | N/A |
| CE4 | AP6 | 3.5% thyme oil<br>3% eugenol | 140 | 2.3 | 150 | 150 | 120 | N/A |
| CE5 | AP7 | 3.5% thyme oil<br>6.5% geranium oil | 130 | 2.2 | 120 | 120 | 150 | N/A |
| CE6 | AP8 | 3.5% thyme oil<br>5% citronella oil | 130 | 2.2 | 150 | 120 | 120 | N/A |
| CE7 | AP9 | 0.5% clove bud oil<br>6.5% geranium oil<br>0.7% lemongrass oil | 120 | 2.0 | 120 | 120 | 120 | N/A |
| CE8 | AP10 | 5% citronella oil<br>3.5% geraniol | 120 | 2.0 | 90 | 120 | 150 | N/A |
| CE9 | AP11 | 5% peppermint oil<br>3% eugenol | 120 | 2.0 | 120 | 120 | 120 | N/A |
| CE10 | AP12 | 3.5% thyme oil<br>5% peppermint oil | 120 | 2.0 | 120 | 150 | 90 | N/A |
| CE11 | AP13 | 6.5% geranium oil<br>1.5% geraniol | 120 | 2.0 | 60 | 180 | 120 | 120 |
| CE12 | AP14 | 0.5% clove bud oil<br>3.5% thyme oil<br>0.7% lemongrass oil | 110 | 1.8 | 90 | 120 | 120 | N/A |
| CE13 | AP15 | 3.5% thyme oil<br>5% geraniol | 100 | 1.7 | 90 | 60 | 150 | N/A |
| CE14 | AP16 | 5% citronella oil<br>5% geranium oil | 100 | 1.7 | 60 | 120 | 120 | N/A |
| CE15 | AP17 | 10% peppermint oil in water/isopropanol | 100 | 1.7 | 150 | 120 | 30 | N/A |
| CE16 | AP18 | 6.5% geranium oil<br>3% eugenol | 100 | 1.7 | 120 | 90 | 90 | 100 |
| CE17 | AP19 | 3% eugenol in water/isopropanol | 100 | 1.7 | 60 | 120 | 120 | 100 |
| CE18 | AP20 | 5% citronella oil<br>0.5% clove bud oil | 90 | 1.5 | 150 | 90 | 30 |  |
| CE19 | AP21 | 3.5% thyme oil | 90 | 1.5 | 90 | 120 | 60 | N/A |
| CE20 | AP22 | 0.7% lemongrass oil<br>5% geraniol | 90 | 1.5 | 90 | 120 | 60 | N/A |
| CE21(a) | AP23 | 0.5% clove bud oil<br>3.5% thyme oil<br>0.7% lemongrass oil | 90 | 1.5 | 90 | 90 | 90 | 90 |
| CE21(b) | AP24 | 0.5% clove bud oil<br>3.5% thyme oil<br>5% peppermint oil | 80 | 1.3 | 120 | 60 | 60 | 80 |
| CE22 | AP25 | 0.7% lemongrass oil | 80 | 1.3 | 90 | 90 | 60 | N/A |
| CE23 | AP26 | 10% citronella oil | 75 | 1.3 | 120 | 30 | N/A | N/A |
| CE24 | AP27 | 5% peppermint oil<br>5% geraniol | 70 | 1.2 | 90 | 90 | 30 | N/A |
| CE25 | AP28 | 0.5% clove bud oil<br>0.7% lemongrass oil | 70 | 1.2 | 120 | 30 | 60 | N/A |
| CE26 | AP29 | 0.5% clove bud oil<br>5% geraniol | 70 | 1.2 | 60 | 90 | 60 | N/A |

TABLE 2-continued

| Sample No. | Active Package Identifier | Sample (in water/isopropanol) | Avg Duration (Min) | Avg Duration (Hours) | Duration (Min) (Time of confirmation land) | | | |
|---|---|---|---|---|---|---|---|---|
| | | | | | Subject 1 | Subject 2 | Subject 3 | Subject 4 |
| CE27 | AP30 | 5% citronella oil 5% peppermint oil | 70 | 1.2 | 60 | 120 | 30 | N/A |
| CE28 | AP31 | 3.5% Thyme 0.7% Lemongrass oil | 66 | 1.1 | 60 | 60 | 60 | 90 |
| CE29 | AP32 | 3.5%Thyme oil 0.5% clove bud oil | 66 | 1.1 | 60 | 30 | 90 | 90 |
| CE30 | AP33 | 10% geranium oil | 60 | 1 | 60 | 60 | N/A | N/A |
| CE31 | AP34 | 0.7% lemongrass oil 5% peppermint oil | 60 | 1 | 90 | 30 | N/A | N/A |
| CE32 | AP35 | 0.5% clove bud oil 6.5% geranium oil | 60 | 1 | 60 | 60 | 60 | N/A |
| CE33 | AP36 | 5% citronella oil 3% eugenol | 50 | 0.8 | 90 | 30 | 30 | 50 |
| CE34 | AP37 | 0.5% clove bud oil 2.5% eugenol | 50 | 0.8 | 60 | 60 | 30 | N/A |
| CE35 | AP38 | 5% geraniol 3% eugenol | 50 | 0.8 | 30 | 90 | 30 | N/A |
| CE36 | AP38 | 6% geraniol | 50 | 0.8 | 30 | 60 | 60 | N/A |
| CE37 | AP39 | 0.5% clove bud oil 5% peppermint oil | 50 | 0.8 | 30 | 60 | 60 | |
| CE38 | AP40 | 0.7% lemongrass oil 3% eugenol | 45 | 0.8 | 60 | 30 | | |
| CE39 | AP41 | 0.5% clove bud oil | 40 | 0.7 | 60 | 30 | 30 | |

As can be seen from Table 2, two active packages IE1/AP1 and IE2/AP2,), were found to provide surprisingly long durations, specifically durations greater than 2.5 hours (i.e. greater than 150 minutes). For the results shown in Table 2, duration was defined using the 100% repellency threshold (i.e. complete protection time (CPT)). The surprisingly long durations of these active packages make them particularly beneficial for use in insect repellent formulations, where minimizing the number of re-applications by maximizing effective duration is important to consumers and a key market differentiator.

As a result of its surprisingly long duration, in combination with other beneficial qualities, actives package IE2 was selected for incorporation in various layered technologies (further described below) that are part of the present insect repellent formulations. One reason IE2 was selected for initial incorporation in the layered technologies and insect repellent formulations above IE1 was due to certain properties such as, but not limited to, fragrance and skin-feel of IE2 being considered more favorable over the corresponding properties of IE1.

The actives package IE2 was incorporated into different formulations that included certain layered technologies, as shown below in Table 3. The formulation ingredients work synergistically with the particular oils in the inventive actives package(s) (e.g. IE1/AP1 and IE2/AP2) to effectively reduce the evaporation of the essential oil active package from a subject's skin, thereby increasing bioavailability of the oils, and repellency duration, against *Culex* mosquitoes. The formulation was designed with a technology-layer system. The particular essential oils within the inventive active package(s) of the inventive formulation interact with a duration-extending technology, which is then referred to as a technology-layer. The technology-layers build upon each other using different mechanisms to slow the evaporation of the essential oils from the skin. One example of such a layered technology formulation is Inventive Formulation 1 (IF1), which includes the IE2/AP2 as an actives package, are shown in Table 3. The concentration of each component in the formulation is listed as a weight percentage (wt. %), based on the total weight of the entire formulation.

TABLE 3

| Raw Materials | CAS Number | Function | Inventive Formula 1 (IF1) |
|---|---|---|---|
| Clove Oil | 8000-34-8 | Active Ingredient | 0.5 |
| Geranium Oil | 8000-46-2 | Active Ingredient | 5 |
| Peppermint Oil | 68917-18-0 | Active Ingredient | 4.5 |
| Vanillin | 121-33-5 | Fixative | 5 |
| Isopropyl Alcohol | 67-63-0 | Solubilizer | 30 |
| *Quillaja* Saponin | 1393-03-9 | Co-emulsifier | |
| Triethyl Citrate | 77-93-0 | Fixative | |
| Polyglyceryl Oleate | 9007-48-1 | Co-emulsifier | |
| Microcrystalline Cellulose Water | 9004-34-6; 9004-32-4 | Stabilizer, Thickener Carrier | |
| Fumed Silica | 112945-52-5 | Fixative | 2 |
| Mineral Oil | 8042-47-5 | Emollient | 46.5 |
| Lauric Acid | 143-07-7 | Emollient | 6.5 |
| Glycerin | 56-81-5 | Humectant, Plasticizer | |
| Hydroxypropyl Methylcellulose | 9004-65-3 | Bio-Film Former | |

Inventive Formulation 1 (IF1)—The essentials oils are combined with fumed silica which is capable of adsorbing oils onto its surface, this is deemed technology-layer 1. This is then combined with mineral oil and lauric acid, emollients that repair the stratum corneum to help reduce dermal penetration (lauric acid) and do not absorb into the skin (mineral oil), this is deemed technology-layer 2. The Mineral Oil is White Mineral Oil with a CAS-#of 8012-95-1. One fixative is added to the formula (vanillin) which will help to anchor the essential oils to the skin, this is deemed technology-layer 3.

The effective duration, defined using the 100% repellency threshold (i.e. as CPT) and/or the Arm-in-Cage Test (i.e. 90% repellency), for each layered technology formulation was evaluated. The results of these tests are shown below in Tables 4, 5, and 6 below.

TABLE 4

| Sample No. | Actives Package Identifier | Avg Duration (Min) | Avg Duration (Hours) | Duration (Minutes) *Time of confirmation land Subject 1 | Subject 2 | Subject 3 | Layered Technologies |
|---|---|---|---|---|---|---|---|
| CF1 | AP2 | 350 | 5.8 | 5.5 hrs | 4 hrs | 8 hrs | Emulsion-Based & Triethyl Citrate |
| CF2 | AP1 | 430 | 7.2 | 390 | 420 | 480 | Mineral Oil-Based w/Silica & Vanillin |
| CF3 | AP1 | 390 | 6.5 | 330 | 390 | 450 | Emulsion-Based w/HPMC (Film Former) & Vanillin |
| CF4 | AP1 | 380 | 6.3 | 420 | 270 | 450 | Mineral Oil-Based w/Triethyl Citrate, Lauric Acid & Vanillin |
| CF5 | AP1 | 340 | 5.7 | 300 | 330 | 390 | Emulsion-Based w/Vanillin & Triethyl Citrate |
| CF6 | AP1 | 330 | 5.5 | 300 | 330 | 360 | Emulsion-Based w/Vanillin, Triethyl Citrate & Silica |
| CF7 | AP1 | 330 | 5.5 | 270 | 330 | 390 | Liquid Coconut Oil-Based w/Vanillin |
| CF8 | AP1 | 280 | 4.7 | 210 | 360 | 270 | Mineral Oil-Based w/Lauric Acid |
| CF9 | AP1 | 260 | 4.3 | 270 | 270 | 240 | Mineral Oil-Based w/Paraffin Wax (Film Former) |
| CF10 | AP1 | 260 | 4.3 | 150 | 270 | 360 | Emulsion-Based w/HPMC (Film Former), Vanillin & Silica |
| CF11 | AP1 | 250 | 4.2 | 150 | 210 | 390 | Liquid Coconut Oil-Based |
| CF12 | AP1 | 230 | 3.8 | 210 | 150 | 330 | Mineral-Oil Based w/Silica |
| CF12(b) | AP1 | 220 | 3.7 | 150 | 210 | 300 | Mineral-Oil Based w/β-Cyclodextrin Encapsulated Geraniol |
| CF13 | AP1 | 210 | 3.5 | 150 | 330 | 150 | Water-Based w/Vanillin |
| CF14 | AP1 | 200 | 3.3 | 270 | 210 | 120 | Water-Based w/HPMC (Film-Former) |
| CF15 | AP1 | 190 | 3.2 | 120 | 210 | 240 | Emulsion-Based |
| CF16 | AP1 | 170 | 2.8 | 150 | 210 | 150 | Emulsion-Based w/Silica |
| CF17 | AP1 | 160 | 2.7 | 150 | 180 | 150 | Emulsion-Based w/Triethyl Citrate |
| CF18 | AP1 | 150 | 2.5 | 90 | 180 | 180 | Mineral-Oil Based |

*AP1-0.5% Clove bud + 3.5% Thyme + 5% Citronella
AP2-0.5% Clove bud + 5% Geranium + 4.5% Peppermint The formulation of each layered technology used in the examples above is as follows (all amounts are provided as w/w in percentages (%)):

| Formula CF1 | Raw Materials | Function | Concentration (w/w in %) |
|---|---|---|---|
| | Clovebud Oil | Active Ingredient | 0.5 |
| | Geranium Oil | Active Ingredient | 5 |
| | Peppermint Oil | Active Ingredient | 4.5 |
| | Vanillin | Fixative | 5 |
| | Isopropyl Alcohol | Solubilizer | 10 |
| | *Quillaja* Saponin | Fixative | 0.64 |
| | Glycerin | Humectant | 2 |
| | Hydroxypropyl Methylcellulose | Film Former | 2 |
| | Polyglyceryl Oleate | Co-Emulsifier | 0.36 |
| | Isopropyl Myristate | Emollient | 2 |
| | Water | Carrier | 70 |

| Formula CF15 | Raw Materials | Function | Concentration (w/w in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | *Quillaja* Saponin | Co-Emulsifier | 0.64 |
| | Polyglyceryl Oleate | Co-Emulsifier | 0.36 |
| | Isopropyl Myristate | Emollient | 2 |
| | Water | Carrier | 88 |

| Formula CF5 | Raw Materials | Function | Concentration (w/w in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | *Quillaja* Saponin | Co-Emulsifier | 0.64 |
| | Isopropyl Alcohol | Solubilizer | 10 |
| | Polyglyceryl Oleate | Co-Emulsifier | 0.36 |
| | Vanillin | Fixative | 5 |
| | Triethyl Citrate | Fixative | 5 |
| | Microcrystalline Cellulose/ Cellulose Gum | Thickner/ Stabilizer | 1 |
| | Water | Carrier | 69 |

| Formula CF6 | Raw Materials | | Concentration (w/w in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | Fumed Silica | Fixative | 2 |
| | Isopropyl Myristate | Emollient | 2 |
| | Glycerin | Humectant | 1 |
| | *Quillaja* Saponin | Co-Emulsifier | 0.64 |
| | Vanillin | Fixative | 5 |
| | Polyglyceryl Oleate | Co-Emulsifier | 0.36 |
| | Microcrystalline Cellulose/ Cellulose Gum | Thickner/ Stabilizer | 1 |
| | Isopropyl Alcohol | Solubilizer | 10 |
| | Triethyl Citrate | Fixative | 5 |
| | Water | Carrier | 64 |

| Formula CF14 | Raw Materials | | Concentration (w/w in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | Hydroxypropyl Methylcellulose | Bio-Film Former | 2 |
| | Glycerin | Humectant | 2 |
| | Isopropyl Alcohol | Solubilizer | 42 |
| | Water | Carrier | 45 |

| Formula CF18 | Raw Materials | | Concentration (w/w in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | Isopropyl Myristate | Emollient | 11 |
| | Mineral Oil | Emollient | 80 |

| Formula CF9 | Raw Materials | | Concentration (w/w in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | Isopropyl Myristate | Emollient | 9 |
| | Mineral Oil | Emollient | 80 |
| | Paraffin Wax | Film Former | 2 |

| Formula CF8 | Raw Materials | | Concentration (w/w in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | Mineral Oil | Emollient | 48.5 |
| | Lauric Acid | Solubilizer | 6.5 |
| | Isopropyl Alcohol | Solubilizer | 36 |

| Formula CF12 | Raw Materials | | Concentration (w/w in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | Mineral Oil | Emollient | 80 |
| | Isopropyl Myristate | Emollient | 9 |
| | Fumed Silica | Fixative | 2 |

| Formula CF11 | Raw Materials | | Concentration (in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | MCT Oil | Emollient | 91 |

| Formula CF13 | Raw Materials | | Concentration (in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | Vanillin | Fixative | 5 |
| | Isopropyl Alcohol | Solubilizer | 40 |
| | Water | Carrier | 46 |

| Formula CF 12(b) | Raw Materials | | Concentration (in %) |
|---|---|---|---|
| | Geraniol | Active Ingredient | 4 |
| | Geraniol Encapsulated in Beta-Cyclodextrin | Active Ingredient | 20 |
| | Mineral Oil | Emollient | 76 |

| Formula CF16 | Raw Materials | | Concentration (in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | Silica | Fixative | 2 |
| | Microcrystalline Cellulose/ Cellulose Gum | Thickner/ Stabilizer | 1 |
| | Isopropyl Myristate | Emollient | 2 |
| | Polyglyceryl Oleate | Co-Emulsifier | 0.36 |
| | *Quillaja* Saponin | Co-Emulsifier | 0.64 |
| | Water | Carrier | 85 |

| Formula CF7 | Raw Materials | | Concentration (in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | MCT Oil | Emollient | 50 |
| | Vanilla | Fixative | 5 |
| | Isopropyl Alcohol | Solubilizer | 36 |

| Formula CF2 | Raw Materials | | Concentration (in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | Fumed Silica | Fixative | 2 |
| | Lauric Acid | Solubilizer | 6.5 |
| | Mineral Oil | Emollient | 47.5 |
| | Vanillan | Fixative | 5 |
| | Isopropyl Alcohol | Solubilizer | 30 |

| Formula CF4 | Raw Materials | | Concentration (in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | Vanillin | Fixative | 5 |
| | Mineral Oil | Emollient | 44.5 |
| | Isopropyl Alcohol | Solubilizer | 30 |
| | Triethyl Citrate | Fixative | 5 |
| | Lauric Acid | Solubilizer | 6.5 |

| Formula CF3 | Raw Materials | | Concentration (in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | Hydroxypropyl Methylcellulose | Film Former | 2 |
| | Vanillin | Fixative | 5 |
| | Glycerin | Humectant | 2 |
| | *Quillaja* Saponin | Co-Emulsifier | 0.64 |
| | Polyglyceryl Oleate | Co-Emulsifier | 0.36 |
| | Isopropyl Alcohol | Solubilizer | 10 |
| | Water | Carrier | 71 |

| Formula CF10 | Raw Materials | | Concentration (in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | Hydroxypropyl Methylcellulose | Film Former | 2 |
| | Silica | Fixative | 2 |
| | Vanillin | Fixative | 5 |
| | Glycerin | Humectant | 2 |
| | *Quillaja* Saponin | Co-Emulsifier | 0.64 |
| | Polyglyceryl Oleate | Co-Emulsifier | 0.36 |
| | Isopropyl Alcohol | Solubilizer | 10 |
| | Water | Carrier | 69 |

| Formula CF17 | Raw Materials | | Concentration (in %) |
|---|---|---|---|
| | Clovebud Oil | Active Ingredient | 0.5 |
| | Thyme Oil | Active Ingredient | 3.5 |
| | Citronella Oil | Active Ingredient | 5 |
| | Triethyl Citrate | Fixative | 5 |
| | *Quillaja* Saponin | Co-Emulsifier | 0.64 |
| | Polyglyceryl Oleate | Co-Emulsifier | 0.36 |
| | Water | Carrier | 85 |

TABLE 5

| Sample No. | Actives Package (EO's) | Avg Duration of Formulation (Min) | Avg Duration Formulation (Hours) | Avg Duration Actives (Essential Oil) Package Only | Duration (Minutes) *Time of confirmation land | | | Ratio of Avg. Durations: Formulation/ Actives only |
|---|---|---|---|---|---|---|---|---|
| | | | | | Subj. 1 | Subj. 2 | Subj. 3 | |
| CF4 | IE1/AP1 | 340 | 5.7 | 3 | 300 | 330 | 390 | 1.9 |
| CF1 | IE1/AP1 | 430 | 7.2 | 3 | 390 | 420 | 480 | 2.4 |
| CF2 | IE1/AP1 | 390 | 6.5 | 3 | 330 | 390 | 450 | 2.16 |
| CF3 | IE1/AP1 | 380 | 6.3 | 3 | 420 | 270 | 450 | 2.1 |

AP1-0.5% Clove bud + 3.5% Thyme + 5% Citronella
AP2-0.5% Clove bud + 5% Geranium + 4.5% Peppermint

TABLE 6

| Sample No. | Active Package | Avg. Duration | Ratio of Avg. Durations: Formulation/ Actives only | Time where % repellency dropped below 90%* | | |
|---|---|---|---|---|---|---|
| | | | | Subject 1 | Subject 2 | Subject 3 |
| IF1 | IE1/AP2 | 7.5+ hrs | 2.8 | 8+ hrs | 7.5+ hrs | 6.5 hrs |
| CF1 | IE1/AP2 | 5.8 hrs | 2.1 | 5.5 hrs | 4 hrs | 8 hrs |
| CF19 | IE2/AP2 | 4.3 hrs | 1.6 | 5 hrs | 4 hrs | 4 hrs |
| CF20 | IE2/AP2 | 3.3 hrs | 1.2 | 2.5 hrs | 6 hrs | 1.5 hrs |

As can be seen from Tables 5 and 6, IF1 was found to have a surprisingly long duration, in particular a duration of greater than 7.5 hours (i.e. greater than 450 minutes). Moreover, IF1 was also found to exhibit a surprisingly large improvement in duration time, as compared to the actives package alone. In particular, the ratio of the duration of IF1 with respect to the duration the actives package alone (AP2) was surprisingly found to be greater than 2.5 to 1. In fact, the addition of the layered technologies comprised in IF1 advantageously nearly tripled the duration of the actives package (IE2/AP2) providing a 7.5-hour duration for IF1 compared to the 2.7-hour duration of IE2/AP2. The surprisingly long durations of formulation IF1, in combination with its other commercially desirable properties (such as fragrance and skin-feel) make formulation IF1 particularly beneficial for use in insect repellents.

Additionally, the oil-based formulations of the present disclosure not only exhibit surprisingly long average durations, but their specific formulations enable them to exhibit a positive skin-feel as well as a pleasant odor. Compositions with formulations that differ from those contemplated herein may exhibit the balance of these traits, even if they happen to exhibit one or two of these traits.

Any of the embodiments described herein may be modified to include any of the structures, compositions, or methodologies disclosed in connection with different embodiments.

The following embodiments are provided as potential example compositions of the present disclosure:

Embodiment 1. A composition for repelling insects, the composition comprising:
  i. an active component comprising clove oil, peppermint oil, and geranium oil;
  ii. a fixative; and
  iii. a solubilizer.

Embodiment 2. A composition for repelling insects, the composition comprising:
  i. an active component comprising:
    a) at least one essential oil selected from the group consisting of clove oil, geraniol, and lemongrass oil; and
    b) at least two essential oils selected from the group consisting of peppermint oil, geranium oil, thyme oil, citronella oil, and eugenol; and
  ii. a fixative; and
  iii. a solubilizer.

Embodiment 3. A composition for repelling insects, the composition comprising:
  i. an active component comprising:
    a) clove oil, geranium oil, and peppermint oil; or
    b) clove oil, thyme oil, and citronella oil;
  ii. a fixative; and
  iii. a solubilizer.

Embodiment 4. The composition of embodiments 1 or 2, wherein the active component consists essentially of clove oil, geranium oil, and peppermint oil.

Embodiment 5. The composition of any one embodiment 1-3, wherein the active component consists of clove oil, geranium oil, and peppermint oil.

Embodiment 4. The composition of any one embodiment 1-3, wherein the fixative is selected from the group consisting of vanillin, esters of organic acids, fumed silica, alkoxylated alcohols, glycol ethers, glycerin aliphatic acid esters, polyethylene glycol, and any combination thereof.

Embodiment 5. The composition of any one embodiment 1-3, wherein the fixative is vanillin.

Embodiment 6. The composition of any one embodiment 1-3, wherein the fixative is a combination of vanillin and triethyl citrate.

Embodiment 7. The composition of any one embodiment 1-3, wherein the fixative is a combination of vanillin and fumed silica.

Embodiment 8. The composition of any one embodiment 1-3, wherein the solubilizer is selected from the group consisting of $C_1$-$C_8$ alcohols, hydrogenated oils, polyethoxylated oils, alkoxylated alcohols, alkylene glycols, glycol ethers, and any combination thereof Embodiment 9. The composition of any one embodiment 1-3, wherein the solubilizer is selected from the group consisting of isopropyl alcohol, PEG-40 hydrogenated castor oil, ethoxylated $C_8$-$C_{16}$ alcohol, propylene glycol, ethylene glycol n-hexyl ether, and any combination thereof.

Embodiment 10. The composition of any one embodiment 1-3, wherein the solubilizer is isopropyl alcohol.

Embodiment 11. The composition of any one embodiment 1-3, wherein the active component is present in an amount from about 5 wt. % to about 15 wt. % wherein all weight percentages are percent by weight of the total composition.

Embodiment 12. The composition of any one embodiment 1-3, wherein the active component is present in an amount from about 10 wt. % to about 12 wt. % wherein all weight percentages are percent by weight of the total composition.

Embodiment 13. The composition of any one embodiment 1-3, wherein the active component is present in an amount from about 11 wt. % to about 12 wt. % wherein all weight percentages are percent by weight of the total composition.

Embodiment 14. The composition of any one embodiment 1-3, wherein the active component comprises:
i. from about 0.1 wt. % to about 3.0 wt. % of clove oil;
ii. from about 0.5 wt. % to about 10.0 wt. % of geranium oil; and
iii. from about 0.1 wt. % to about 10.0 wt. % of peppermint oil, wherein all weight percentages are percent by weight of the total composition.

Embodiment 15. The composition of any one embodiment 1-3, wherein the active component comprises:
i. from about 0.1 wt. % to about 1.0 wt. % of clove oil;
ii. from about 4.5 wt. % to about 7.5 wt. % of geranium oil; and
iii. from about 3.0 wt. % to about 6.0 wt. % of peppermint oil,
wherein all weight percentages are percent by weight of the total composition.

Embodiment 16. The composition of any one embodiment 1, wherein the active component comprises:
i. about 0.5 wt. % of clove oil;
ii. about 6.5 wt. % of geranium oil; and
iii. about 4.5 wt. % of peppermint oil,
wherein all weight percentages are percent by weight of the total composition.

Embodiment 17. The composition of any one embodiment 1-3, wherein the fixative is present in an amount from about 3 wt. % to about 15 wt. % wherein all weight percentages are percent by weight of the total composition.

Embodiment 18. The composition of any one embodiment 1-3, wherein the fixative is present in an amount from about 5 wt. % to about 10 wt. % wherein all weight percentages are percent by weight of the total composition.

Embodiment 19. The composition of any one embodiment 1-3, wherein the solubilizer is present in an amount from about 5 wt. % to about 45 wt. % wherein all weight percentages are percent by weight of the total composition.

Embodiment 20. The composition of any one embodiment 1-3, wherein the solubilizer is present in an amount from about 10 wt. % to about 30 wt. % wherein all weight percentages are percent by weight of the total composition.

Embodiment 21. The composition of any one embodiment 1-3, wherein the solubilizer is present in an amount from about 5 wt. % to about 15 wt. % wherein all weight percentages are percent by weight of the total composition.

Embodiment 22. The composition of any one embodiment 1-3, wherein the solubilizer is present in an amount from about 25 wt. % to about 35 wt. % wherein all weight percentages are percent by weight of the total composition.

Embodiment 23. The composition of embodiment 24, wherein the fixative is selected from the group consisting of vanillin, esters of organic acids, fumed silica, alkoxylated alcohols, glycol ethers, glycerin aliphatic acid esters, polyethylene glycol, and any combination thereof.

Embodiment 24. The composition of embodiment 24, wherein the fixative is vanillin.

Embodiment 25. The composition of embodiment 24, wherein the fixative is a combination of vanillin and triethyl citrate.

Embodiment 26. The composition of embodiment 24, comprising from about 7 wt. % to about 15 wt. % of the fixative, and wherein the fixative comprises vanillin and triethyl citrate.

Embodiment 27. The composition of embodiment 24, wherein the fixative is a combination of vanillin and fumed silica.

Embodiment 28. The composition of embodiment 24, wherein the fixative is present in an amount from about 3 wt. % to about 15 wt. % wherein all weight percentages are percent by weight of the total composition.

Embodiment 29. The composition of embodiment 24, wherein the fixative is present in an amount from about 5 wt. % to about 10 wt. % wherein all weight percentages are percent by weight of the total composition.

Embodiment 30. The composition of embodiment 24, wherein the solubilizer is selected from the group consisting of $C_1$-$C_8$ alcohols, hydrogenated oils, polyethoxylated oils, alkoxylated alcohols, alkylene glycols, glycol ethers, and any combination thereof.

Embodiment 31. The composition of embodiment 24, wherein the solubilizer is selected from the group consisting of isopropyl alcohol, PEG-40 hydrogenated castor oil, ethoxylated $C_8$-$C_{16}$ alcohol, propylene glycol, ethylene glycol n-hexyl ether, and any combination thereof.

Embodiment 32. The composition of embodiment 24, wherein the solubilizer is isopropyl alcohol.

Embodiment 33. The composition of embodiment 24, wherein the solubilizer is present in an amount from about 5 wt. % to about 45 wt. % wherein all weight percentages are percent by weight of the total composition.

Embodiment 34. The composition of embodiment 24, wherein the solubilizer is present in an amount from about 5 wt. % to about 15 wt. % wherein all weight percentages are percent by weight of the total composition.

Embodiment 35. The composition of embodiment 39 further comprising a thickener.

Embodiment 36. The composition of embodiment 39, wherein the thickener is selected from the group consisting of cellulose derivatives, gums, pectin, carrageenan, starch, bentonite, and combinations thereof.

Embodiment 37. The composition of embodiment 39, wherein the thickener is microcrystalline cellulose.

Embodiment 38. The composition of embodiment 39, wherein the thickener is present in an amount from about 0.1 wt. % to about 5.0 wt. % wherein all weight percentages are percent by weight of the total composition.

Embodiment 39. The composition of embodiment 39, wherein the thickener is present in an amount from about 0.5 wt. % to about 1.5 wt. % wherein all weight percentages are percent by weight of the total composition.

Embodiment 40. The composition of embodiment 39, further comprising a humectant.

Embodiment 41. The composition of embodiment 39 wherein the humectant is selected from the group consisting of glycerin, propylene glycol, diglycerin, sodium pryoglutamic acid, hyaluronic acid, pentylene glycol, squalene, sodium hyaluronate, butylene glycol, aloe vera, coconut butter, coconut oil, grape seed oil, red raspberry seed oil, shea butter, and combinations thereof.

Embodiment 42. The composition of embodiment 39, wherein the humectant is glycerin.

Embodiment 43. The composition of embodiment 39, wherein the humectant is present in an amount from about 0.1 wt. % to about 5.0 wt. % wherein all weight percentages are percent by weight of the total composition.

Embodiment 44. The composition of embodiment 39, wherein the humectant is present in an amount from about 1 wt. % to about 3 wt. % wherein all weight percentages are percent by weight of the total composition.

Embodiment 45. The composition of embodiment 39 further comprising an encapsulant.

Embodiment 46. The composition of embodiment 39, wherein the encapsulant is selected from the group consisting of polymers, capsules, microcapsules, nanocapsules, liposomes, absorbents, cyclic oligosaccharides, and combinations thereof.

Embodiment 47. The composition of embodiment 39, wherein the encapsulant is a cyclodextrin.

Embodiment 48. The composition of embodiment 39, wherein the encapsulant is a β-cyclodextrin.

Embodiment 49. The composition of embodiment 39, wherein the composition has a complete protection time (CPT) that is greater than or equal to 2 hours, as measured by a "K & D Module Repellency Test".

Embodiment 50. The composition of embodiment 39, wherein the composition has a complete protection time (CPT) that is greater than or equal to 4 hours, as measured by a "K & D Module Repellency Test".

Embodiment 51. The composition of embodiment 39, wherein the composition has a complete protection time (CPT) that is greater than or equal to 6 hours, as measured by a "K & D Module Repellency Test".

Embodiment 52. The composition of embodiment 39, wherein the composition has a complete protection time (CPT) that is greater than or equal to 8 hours, as measured by a "K & D Module Repellency Test".

Embodiment 53. A composition for repelling insects, the composition comprising:
  i. an active component consisting essentially of
    a) from about 0.1 wt. % to about 3.0 wt. % of clove oil;
    b) from about 0.5 wt. % to about 10.0 wt. % of geranium oil; and
    c) from about 0.1 wt. % to about 10.0 wt. % of peppermint oil;
  ii. a fixative; and
  iii. a solubilizer, and
  wherein the composition has a complete protection time (CPT) that is greater than or equal to 2.5 hours, as measured by a "K & D Module Repellency Test",
  wherein all weight percentages are percent by weight of the total composition.

Embodiment 54. The composition of embodiment 68, wherein the composition has a complete protection time (CPT) that is greater than or equal to 2.7 hours, as measured by a "K & D Module Repellency Test".

Embodiment 55. The composition of embodiment 70, wherein the composition has a complete protection time (CPT) that is greater than or equal to 6 hours, as measured by a "K & D Module Repellency Test".

Embodiment 56. The composition of embodiment 70, wherein the composition has a complete protection time (CPT) that is greater than or equal to 8 hours, as measured by a "K & D Module Repellency Test".

Embodiment 57. The composition of embodiment 73, wherein the composition has a duration that is greater than or equal to 6 hours.

Embodiment 58. The composition of embodiment 73, wherein the composition has a duration that is greater than or equal to 7.5 hours.

INDUSTRIAL APPLICABILITY

Numerous modifications to the present disclosure will be apparent to those skilled in the art in view of the foregoing description. Accordingly, this description is to be construed as illustrative only and is presented for the purpose of enabling those skilled in the art to make and use the disclosure and to teach the best mode of carrying out same. The exclusive rights to all modifications which come within the scope of the appended claims are reserved.

The invention claimed is:

1. A pest control composition comprising:
  an active ingredient, wherein the active ingredient includes clove oil, geranium oil, and peppermint oil;
  a fixative, wherein the fixative includes vanillin and *Quillaja saponin*;
  a solubilizer, wherein the solubilizer includes isopropyl alcohol;
  a humectant, wherein the humectant includes glycerin;
  a film former, wherein the film former includes hydroxypropyl methylcellulose;
  an emollient, wherein the emollient includes polyglyceryl oleate and isopropyl myristate; and
  a carrier, wherein the carrier includes water.

2. The composition of claim 1, wherein the composition includes from about 2.5 wt. % to about 12 wt. % of the active ingredient.

3. The composition of claim 2, wherein the active ingredient consists essentially of clove oil, geranium oil, and peppermint oil.

4. The composition of claim 1, wherein the composition comprises from about 1 wt. % to about 15 wt. % of the fixative, from about 10 wt. % to about 50 wt. % of the solubilizer, and from about 40 wt. % to about 95 wt. % of the emollient, and wherein all weight percentages are percent by weight of the total composition.

5. The composition of claim 1, wherein the composition comprises from about 0.1 wt. % to about 5.0 wt. % of the humectant.

6. The composition of claim 1, wherein the composition has a duration that is greater than or equal to 7.5 hours.

* * * * *